March 4, 1969

G. F. TSUETAKI 3,431,327

METHOD OF MAKING A BIFOCAL CONTACT LENS WITH
AN EMBEDDED METAL WEIGHT
Filed Aug. 31, 1964

INVENTOR.
GEORGE F. TSUETAKI
BY James T. FitzGibbon
Atty.

United States Patent Office 3,431,327
Patented Mar. 4, 1969

3,431,327
METHOD OF MAKING A BIFOCAL CONTACT LENS WITH AN EMBEDDED METAL WEIGHT
George F. Tsuetaki, 1105 W. Laurence, Chicago, Ill. 60640
Filed Aug. 31, 1964, Ser. No. 393,251
U.S. Cl. 264—1  2 Claims
Int. Cl. B29d 11/00

ABSTRACT OF THE DISCLOSURE

A contact lens unit having a nonconcentrically disposed bifocal segment therein, in which said bifocal segment lies at least partially near an outer edge portion of the lens, and in which a dense metal insert portion is held in place inside said lens unit near a radially outer edge portion thereof, said insert being completely surrounded by the material comprising the contact lens unit, and held in place thereby without the use of adhesives or the like. A process for making such units is described, wherein a lens blank is prepared, a bifocal segment portion hollowed out, the metal insert placed in position, and the liquid plastic bifocal segment material poured in place covering the metal insert. The blank thus formed is then ground into a contact lens, and the metal insert, which serves to orient the lens in position on the eye, is disposed immediately adjacent the interface between the principal lens portion and the bifocal segment portion.

---

The present invention relates to contact lenses for the human eye, and in particular to a novel bifocal lens unit.

By the term bifocal contact lens is meant a lens in which different portions of a lens are designed to have differing indices of refraction. By a bifocal lens blank is means a blank or portion of starting material from which bifocal lenses can readily be made.

In the art of eyeglass fitting, bifocal lenses are universally acknowledged to have a number of advantages, insofar as a person wearing such eyeglasses may readily see distant as well as close objects with excellent acuity and without changing glasses, even when his accommodation is poor. Accordingly, there has been a great demand for bifocal lenses, especially among older eye patients who desire the versatility of such glasses. As a result of this demand, there is a substantial industry which is based on the construction and fitting of bifocal lenses.

Likewise, there has been an increasingly great demand for contact lenses. These lenses, which cover a portion of the eyeball of the wearer, ride in virtually direct contact with the eye, separated therefrom only by a thin film of fluid which covers the eyeball. These lenses, may be somewhat rotatable in use and the rear faces thereof are ground to correspond approximately with the curvature or contour of the cornea portion of the eyeball, while the front faces thereof are curved as is desired by the person fitting the glasses to give the desired optical effect.

Typical modern contact lenses, and the types which are almost universally preferred, cover an area somewhat smaller than the cornea of the eye but an area considerably larger than the pupil of the eye, and are kept in close overlying relation thereto.

Contact lenses have a number of advantages, the principal one being the close contact with the eye and relatively fixed position in use relative to the center of the lens, which naturally results in better optics than is the case where the lenses are held in frames and the eyes look through different portion thereof. In other words, in contact lenses, the line of sight more nearly follows the optical center of the lens.

Another advantage of contact lenses is their desirability from a cosmetic standpoint. In addition, contact lenses are much safer in use than are ordinary eyeglasses, especially for use in sporting activities, etc. Contact lenses have other desirable advantages, known to those familiar with the art, but which are not detailed here.

In recent years, many persons have tried contact lenses and have come to prefer them greatly over other and ordinary eyeglass. However, until now, it has not been practical to provide a satisfactory contact lens for those who desire or need a bifocal lens, for reasons which will be explained in greater detail herein.

Therefore, there exists a great need and a great demand for satisfactory bifocal contact lenses, but this demand has been unfulfilled until now.

The reasons for the difficulties with prior known bifocal contact lens units lies in the heretofore known and used construction thereof and with the methods of making such lenses. The present invention provides a lens of a different construction, and provides a simple method of making such an improved lens, thereby overcoming prior difficulties and providing, for the first time, a completely satisfactory bifocal contact lens.

In general, bifocal contact lenses are of two types, the so-called concentric and the so-called nonconcentric type.

A concentric lens is characterized in that a concentric ring of a material of a different I.R. than that of the principal material surrounds the geometric center of the lens in a generally concentric ring. A lens is also considered concentric when a portion thereof is ground away in a generally concentric pattern relative to the geometric center of the lens. Further characteristics of such lenses will be referred to in greater detail herein.

A nonconcentric bifocal lens is characterized in that the element with the differing optical density or refractive index, commonly known in the art as and sometimes referred to as the bifocal segment of the lens, is located in one sector or portion of the lens, away from the geometric center thereof, as described in greater detail herein. The term index of refraction, or refractive index, is sometimes referred to and abbreviated as "I.R.," and may be so abbreviated herein.

The ordinary bifocal noncontact lens is of this type, ordinarily, inasmuch as the wearer only wishes the higher index or more highly refractive amterial to be near the bottom of the lens, where the glance will be when reading or doing other fine work. Thus, ordinarily, a person wearing a bifocal lens wishes to use the long range vision portion of the lens most of the time, and the reading or close up portion thereof only when he is looking down. If ordinary, noncontact lenses were of the concentric type, the wearer thereof would be unable to look to the side or relatively upwardly at distant objects, and see them clearly at a distance. Therefore, unless some special reason therefor appears, ordinary contact lenses are of the nonconcentric type.

With ordinary spectacles, however, the higher index portion may be made by leaving the outside contour or curvature of the lens fixed, and utilizing a different curvature on the inside surface of the lens or fusing a bifocal segment thereto. Because a contact lens fits directly over the eye, however, treatment resulting in differing rear curvatures is impractical and unsafe with contact lenses.

Unlike ordinary eyeglasses, contact lens have no satisfactory method of preserving their orientation while in contact with the eye. Thus, if a portion of a contact lens is more highly refractive, and the lens is a non-concentric lens, there is no satisfactory method of keeping the higher index portion near the bottom in its desired position. If a concentric bifocal unit is provided, the higher index portion undesirably surrounds the lower index portion entirely, resulting in the disadvantages referred to above.

The only method heretofore known for properly orienting the bifocal contact lens on the eye has been to make the higher index portion lie in a substantially thicker portion of the lens, so that the mass thereof causes the lens ot assume a poistion wherein the higher index portion would be desirably located. However, this method has two additional disadvantages. The first is that the outer lens surface has a curvature with a center which does not lie on the line passing through the lens center and the center of curvature of the inner lens surface. Thus, off-center grinding machines are required to make such lenses, much time is consumed making them, and a very undesirably prismatic effect or eberration results, wherein, for example, objects situated below the wearer, for example the floor, appear to be raised above their true position. Such poor optical conditions may result in effects which are at least troublesome and which may at worst be highly dangerous. In addition, regrinding such lenses to a new prescription or changed curvature is a complex and time-consuming process.

In addition to the undesirable optics of such non-concentric contact lenses, the relatively thicker lower edge or bottom portion theerof is continually being touched in use by the eyelid and, during blinking, if any rotation has started, for any reason, the continued contact by the eyelid tends to aggravate the condition and cause the lens to rotate further.

Thus, it will be seen that the idea bifocal contact lens is one which will be non-concentric, which will have no prismatic effect, and which will have smooth surface contours front and rear, and which will rapidly and effectively orient itself in the desired position of use, and which will remain there under all normal conditions.

In addition, such a lens should desirably, though not necessarily, be of equal cosmetic acceptability with an ordinary contact lens.

Accordingly, it is an object of the present invention to provide a non-concentric bifocal contact lens which is automatically self orienting in use to the desired position of the eye of the wearer.

An additional object of the present invention is to provide a blank from which such a contact lens may be readily made.

It is another object of the present invention to provide a self-orienting bifocal contact lens with smooth arcuate contours on both front and rear faces thereof.

It is an additional object of the present invention to provide a self-orienting contact lens in which both front and rear surface centers of curvature lie substantialy on a line through the geometric center of the lens.

It is another object of the present invention to provide a bifocal contact lens having the above named advantages, and, in addition thereto, having the further advantages of cosmetic acceptability.

It is another object of the present invention to provide a self-orienting bifocal contact lens which has substantially equal thicknesses in corresponding top and bottom portions in poistion of use, that is, a lens which is symmetrical above and below the horizontal axis when viewed in side elevation.

It is another object of the present inveniton to provide a bifocal contact lens in which dense metal portion is provided to cause self-orientation of the lens on the eye.

It is another object of the present invention to provide a bifocal contact lens which includes a dense metal portion disposed therein so as to cause the desired orientation of the lens, without disturbing the vision of the wearer, or creating a safety hazard to his eyes, or detracting from the cosmetic effect of the bifocal contact lenses.

It is an additional object of the present invention to provide a simple and effective method of making such improved bifocal contact lenses.

Another object of the present invention is to provide a simple and effective method for making blanks from which such bifocal contact lenses can readily be made.

These and other objects of the present invention will become more apparent when considered in conjunction with a description of the preferred embodiments of the present invention and as shown in the drawings, in which like reference numerals indicate corresponding parts throughout and in which.

Figures 10, 11, 12:
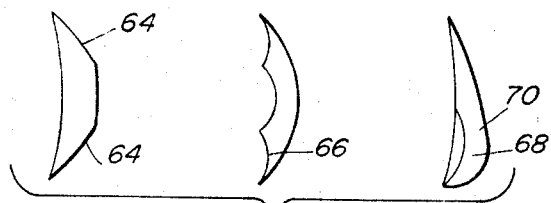

FIGS. 10–12, inclusive, show bifocal contact lenses of the prior art.

Figure 1:
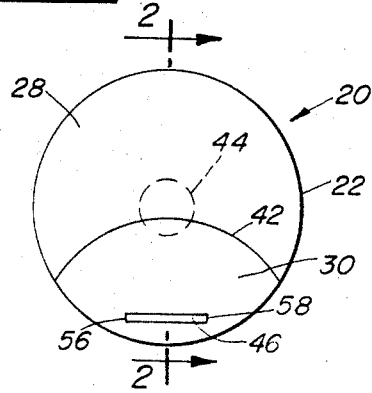
FIG. 1 is a front elevational view of the contact lens unit in its position of use.
Figure 2:
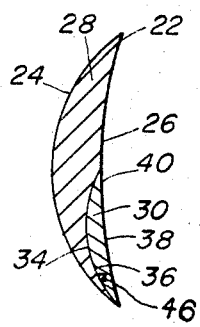
FIG. 2 is a vertical sectional view of the contact lens unit of the present invention.

Referring now to the drawings in greater detail, there is shown generally in FIGS. 1 and 2 a contact lens 20, including an outer surface 22, and front and rear surfaces 24, 26. The body 28 of the lens is made of a clear material, preferably an acrylic plastic, of a given refractive index. An insert 30 is made of a higher index of refraction material, and this insert 30 is shown to have a front surface 34, in contact with the rear cutout surface 36 of the main body 20, and a rear surface 38, the curvature of which is a smooth extension of the curvature of the rear surface 26 of the body 28.

In use, the outside edges 40 of the insert 30 defines a somewhat arcuate line 42, and, in use, this arcuate line defines the bifocal segment 30 of the lens 20. As is shown in FIG. 1, this line 42 extends upwardly sufficiently to cover the bottom portions only of the pupil of the eye, the pupil being illustrated somewhat schematically in its distant viewing position in dotted lines at 44 in FIG. 1. Thus, it will be seen that the bifocal effect is gained by placing a different index material or bifocal segment in the lower portion of the lens. In use, the bottom portion of the lens rests on the lower eyelid, and when the pupil is directed downwardly, the pupil looks through the bifocal segment of the lens. Normally, this insert is also an acrylic plastic, which is similar to the first plastic comprising the body 28, but which has a slightly different index of refraction. The exact amount and placement of such material can be varied to achieve the desired optical characteristics of the lens unit, as referred to further herein.

One of the principal novel features of the present invention is the provision of a dense or high specific gravity metal lens orienting weight unit 46. In the preferred embodiment of the present invention, this weight unit 46 comprises an arcuate front face portion 48, an arcuate rear face portion 50, as well as top and bottom surfaces 52, 54. The side faces 56, 58 of the weight unit 46 terminate within the lens body 20, so that the weight unit is located along the interface formed by the surfaces 34, 36 of the insert 30 and the body 28.

In the preferred construction of the self-orienting contact lens unit of the present invention, liquid plastic, which forms the bifocal segment of the lens, is poured into the spherical countersink portion, and fused to the body 28 without the aid of adhesives. The insert 30 is cast in place over the weight unit 46, and, after the insert material 30 has been placed in the spherical countersink portion the entire lens 20 is subjected to heat to fuse the components together and firmly embed the weight unit 46 in place.

In this manner, there is no danger of adhesives leaching out to damage the wearer of the lens, and there is no danger of any metallic residues or reaction products coming into contact with the eye as long as the integrity of the lens unit is maintained.

In the preferred constructoin, the weight unit 46 is colored to match the iris or colored portion of the eye of the intended wearer, and tests with humans have shown that the weight unit, when so colored, is invisible in use. Suitable coloring materials in the form of non-toxic pigments which are acceptable for use in the optical industry are known to those skilled in the art.

In the preferred construction, the metallic insert is metallic platinum. Although the invention is not intended to be so limited, platinum has the advantages of very great density, very low chemical reactivity and high malleability. Thus, any suitably dense, non-toxic metal of low chemical reactivity might be used, platinum is preferred, for the reasons set forth.

Likewise, it is not necessary that the insert 30 be fused to the lens body 28, but such construction has a number of advantages which are apparent to those skilled in the art.

Ordinarilly, a typical bifocal contact lens of the present invention comprises a lens body 28 which is about 8–11 millimeters in diameter, with a central thickness of about .2–.7 millimeters but which may vary considerably depending upon the prescription. A platinum weight unit 46 is selected so as to suitably rotate the lens to the desired position in use, and such weight unit preferably should at least weigh about 6 milligrams, and preferably about 7.5 milligrams or more. In a typical contact lens of the present invention, the insert is about 0.008 inch thick, about .022 inch high, and about 0.100 inch wide, the dimensions being given in normal position of use, and as shown in FIG. 1 for example. The weight unit is disposed near an outer edge, preferably, to give the greatest moment about the central axis, so that the lens may best be oriented with the minimum amount of weight. The more dense material, such as platinum, are greatly preferred, inasmuch as a more nearly "point" location can be achieved therewith, that is, the weight need only occupy a small volume, and may be precisely placed relative to less dense materials, which not only take longer to orient in use, but which must occupy a great volume and which have a smaller moment for the same weight. The process of the present invention is illustrated in FIGS. 3–8, inclusive.

Figure 3:
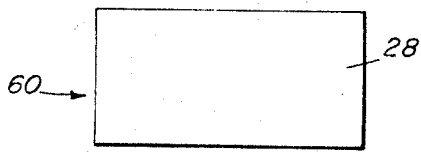
FIG. 3 is a side elevational view of a lens blank before starting the process of the present invention.
Figure 4:
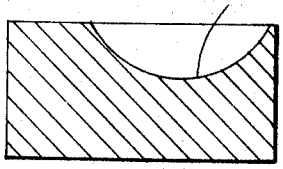
FIG. 4 is a vertical sectional view of a lens blank, following the first step of the process of the invention.

In this process, a blank of body material 28, such as the acrylic plastic referred to above is formed into a right circular cylinder, shown in elevation in FIG. 3. A cutout surface or spherical countersink portion 36 is cut therein, as shown in FIG. 4, to accommodate the more dense optical material insert 30.

Figure 5:
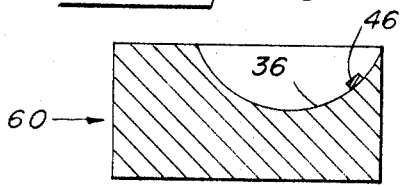
FIG. 5 is a vertical sectional view of the lens blank, and showing a second step in the process.
Figure 6:
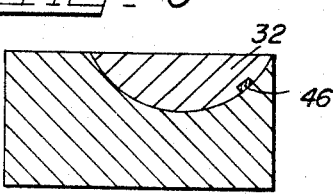
FIG. 6 is a vertical sectional view of the lens blank, showing completion of the third step of the process of the invention.
Figure 7:
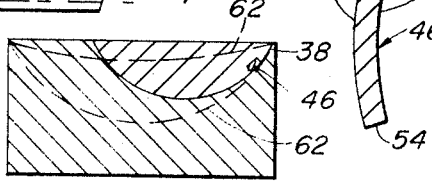
FIG. 7 is a vertical sectional view similar to FIG. 6 but additionally showing, in dotted lines, the contour of the proposed bifocal contact lens of the present invention.

At this point, as shown in FIG. 5, the platinum insert 46 having been previously colored, is placed therein, near the outer edge of the lens blank 60. The weight unit 46 is placed preferably with the rounded front surface 48 face down against the cutout surface 36. Thereafter, the second material 30 of the insert is cast in place, covering the weight unit 46.

Figures 8, 9:
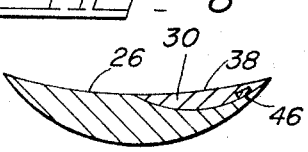
FIG. 8 is a vertical sectional view of a finished self-orienting bifocal contact lens of the present invention, constructed in accordance with the process of the invention.
FIG. 9 is a greatly enlarged vertical sectional view of the heavy metal insert portion of the lens unit.

After the plastic insert 30 has set, the entire unit is cured in order to fuse the two portions into an integral lens unit containing the weight orienting unit 46. Thereafter, the lens maker lays out the desired lines of curvature 62 on the blank, and cuts the lens to the desired prescription. The platinum containing, self-orienting, nonconcentric bifocal lens unit of the present invention is obtained, as shown in FIG. 8. Although the platinum used to produce the self-orienting effect is a precious metal, the cost of an amount typically used in such lenses is only about 30¢–40¢, which is very small in comparison to the other costs involved in providing contact lenses.

Thus, it can be seen that the lens of the present invention has all the advantages desired in a contact lens, and is made by a simple and ingenious process, resulting in a simple but substantially foolproof, safe, and sturdy construction.

Referring now to FIGS. 10–12, there are shown prior art constructions in greater detail.

FIG. 10 shows a concentric bifocal contact lens which undesirably includes exterior beveled or prismatic edge therein, and which is not suitable for satisfactory viewing of distant objects which are above or to the side of the user.

FIG. 11 shows concentric bifocal contact lens which undesirably contains unsafe and inconvenient inner beveled edges, 66 which are shown somewhat exaggerated for clarity. This construction also has all the disadvantages of the form shown in FIG. 10.

FIG. 12 shows a nonconcentric bifocal contact lens, which has the advantages of non-concentricity, but which has the disadvantages of the prismatic effect caused by the thicker lower edges 68, and which, by reason of having only a slightly greater mass at the bottom thereof, orients undesirably slowly, which has a relatively thicker lower portion 70, and which is uncomfortable and which tends to rotate in use especially when the upper lid grasps the thicker portion thereof.

The advantages of the novel lens unit are best appreciated when considered in conjunction with the problem of aircraft pilots and the like. If a pilot uses a concentric bifocal, his distant field of vision is sharply reduced, due to the presence of a bifocal segment on all outside edges of the lens. If a nonconcentric but prismatic lens is used, the peripheral field of vision is adequate, but the prismatic effect causes extremely poor space orientation, and, when judging the height of landing fields, for example, the pilot is at a gravely serious disadvantage. Thus, the lens of the present invention is the only wide field of vision bifocal lens which allows proper space orientation.

In addition, the advantages of the lens of the present invention are obvious when it is considered that many optical patients desire to have lenses which correct astigmatism, whether or not such lenses are bifocal lenses.

It will thus be seen from the foregoing description considered in conjunction with the accompanying drawings, that the present invention provides a novel lens unit and lens blank, and method of making them, and thus has desirable advantages and characteristics and accomplishes its intended objects, including those hereinbefore set out and those which are inherent in the invention.

I claim:

1. A method of making a bifocal contact lens unit comprising the steps of providing a lens blank of a transparent material having a first index of refraction, cutting a curvilinear surface defining a conutersink portion in one end of said blank and at least partially adjacent a radially outer edge portion of said lens blank, placing a dense metal insert portion on said curvilinear surface near a radially outer edge portion of said countersink portion, providing a liquid, optically transparent plastic material which, when cured, has an index of refraction differeing from said first index of refraction, pouring said liquid plastic material into said countersink portion, thereby completely covering said metal insert portion while said metal insert portion is held in place closely adjacent said curvilinear surface, allowing said liquid plastic material to dry in place in said countersink portion, and grinding a bifocal contact lens from the composite lens blank thus formed.

2. A method as defined in claim 1 in which said liquid plastic material comprises an acrylic plastic material.

References Cited

UNITED STATES PATENTS

| | | | |
|---|---|---|---|
| 3,102,157 | 8/1963 | Gamber | 351—160 |
| 3,270,099 | 8/1966 | Camp | 351—177 X |
| 3,279,878 | 10/1966 | Long | 351—161 |

FOREIGN PATENTS 699,736   11/1953   Great Britain.

OTHER REFERENCES

Lester: Residual Astigmatism," article in C.L.A.O. Papers, vol. 1, No. 6, October 1959, pp. 15–18 cited.

DAVID H. RUBIN, *Primary Examiner.*

U.S. Cl. X.R.

351—161, 177